(12) United States Patent
Huang et al.

(10) Patent No.: US 7,729,690 B1
(45) Date of Patent: Jun. 1, 2010

(54) BACKUP AND RESTORE OF USER DATA FOR MOBILE TELEPHONE

(75) Inventors: Zhentao Huang, Nanjing (CN); Jun Lu, Nanjing (CN)

(73) Assignee: Trend Micro, Inc., Tokyo (JP)

( * ) Notice: Subject to any disclaimer, the term of this patent is extended or adjusted under 35 U.S.C. 154(b) by 647 days.

(21) Appl. No.: 11/355,846

(22) Filed: Feb. 15, 2006

(51) Int. Cl.
*H04M 1/725* (2006.01)
*H04M 3/00* (2006.01)
*H04B 1/38* (2006.01)

(52) U.S. Cl. ............... 455/419; 455/558; 455/412.1
(58) Field of Classification Search ............. 455/412.1, 455/419, 418, 558, 422.1, 550.1, 559, 420
See application file for complete search history.

(56) References Cited

U.S. PATENT DOCUMENTS

| | | | | |
|---|---|---|---|---|
| 5,418,837 A * | 5/1995 | Johansson et al. | ............ | 455/558 |
| 6,064,880 A * | 5/2000 | Alanara | .............. | 455/419 |
| 6,836,657 B2 * | 12/2004 | Ji et al. | .............. | 455/419 |
| 6,839,568 B2 * | 1/2005 | Suzuki | .............. | 455/550.1 |
| 7,069,044 B2 * | 6/2006 | Okada et al. | ............ | 455/556.1 |
| 7,107,349 B2 * | 9/2006 | Britt, Jr. | .............. | 709/229 |
| 7,127,242 B1 * | 10/2006 | Olson | .............. | 455/426.1 |
| 7,146,161 B2 * | 12/2006 | Chou | ............ | 455/418 |
| 7,162,229 B2 * | 1/2007 | Kazakevich | ............ | 455/418 |
| 7,349,719 B2 * | 3/2008 | Buniatyan | ............ | 455/557 |
| 7,643,824 B2 * | 1/2010 | Onyon et al. | ............ | 455/419 |
| 2001/0034247 A1 * | 10/2001 | Namiki | ............ | 455/558 |
| 2004/0204092 A1 * | 10/2004 | Sato | ............ | 455/558 |
| 2005/0170827 A1 * | 8/2005 | Nagashima | ............ | 455/419 |
| 2005/0191998 A1 * | 9/2005 | Onyon et al. | ............ | 455/419 |
| 2007/0021112 A1 * | 1/2007 | Byrne et al. | ............ | 455/419 |
| 2007/0105532 A1 * | 5/2007 | Martin et al. | ............ | 455/412.1 |
| 2008/0014914 A1 * | 1/2008 | Kim et al. | ............ | 455/419 |
| 2008/0208617 A1 * | 8/2008 | Onyon et al. | ............ | 705/1 |

* cited by examiner

*Primary Examiner*—Tilahun Gesesse
(74) *Attorney, Agent, or Firm*—Beyer Law Group LLP

(57) ABSTRACT

A mobile telephone includes an application processor, internal memory, an external memory card, a backup software module and a restore software module. User data is stored in the internal memory. The backup software module detects changes in the user data, resulting in modified user data. The modified user data is stored onto the external memory card. When the user data is erased from the internal drive or the wireless device needs to be reset the restore software module reads the modified user data from the external memory card and writes the modified user data back onto the internal memory. In this fashion, any modified user data is not lost when the wireless device is reset.

15 Claims, 8 Drawing Sheets

Mobile Telephone Block Diagram

Backup User Data

Restore User Data

BACKUP AND RESTORE OF USER DATA FOR MOBILE TELEPHONE

FIELD OF THE INVENTION

The present invention relates generally to information storage in a mobile telephone. More specifically, the present invention relates to a technique for backing up and restoring data in a mobile telephone.

BACKGROUND OF THE INVENTION

The threat of computer viruses, worms and other types of malicious software are now commonplace in computer systems. And as the number of data-centric mobile devices grows (e.g., mobile telephones), these devices also will become attractive targets for computer viruses, SMS spam and other malicious software. Many of these handheld devices run the same operating systems thus making it easier for unscrupulous parties to distribute malicious software and to disrupt mobile telephone usage. In addition to frustrating consumers, computer viruses and message spam cause individuals and companies to suffer from lost productivity and the high cost of fixing any problems.

For example, more and more malicious software is now targeting operating systems of mobile telephones. The "SYMBOS_FONTAL" computer virus affects mobile devices running the Symbian operating system including a variety of mobile telephones. The virus is downloaded over the Internet or other network and pretends to be a Nokia antivirus application; it tricks the user into installing it on their mobile telephone. Upon installation it displays a benign message and prompts the user to restart the device. Once the device restarts the virus causes the device to constantly restart; the only way to fix the problem is to restore the factory settings on the telephone, thus erasing any personal information or other data that the user had stored on the telephone.

In addition to the threat of computer viruses and other malicious software, a mobile telephone is subject to other risks because it is not inherently a secure device. For example, a system bug such as an illegal MDL file name length can require a user to reset the telephone to the original factory settings. On the Symbian platform, the MDL file name length should be less than 8 characters. But, the system does not check the installed MDL file name length. Once a file with more than an 8-character name is installed, the telephone cannot be restarted. Other problems such as these may require the telephone to be reset.

Further, personal information stored on a mobile telephone is also at risk due to a variety of other factors such as the telephone hardware, software and power. For one, malicious software might delete and modify personal information. Also, a hardware malfunction may mean that personal information in internal storage cannot be read or cannot be written to.

If any one of these problems affect the telephone recovery can be difficult and important information and data can be lost. The telephone may cease to function normally, may crash, may constantly restart, or the telephone may simply not start at all. Often, the only recourse for the consumer is to reset the telephone and all personal information and data that has been stored on the telephone is lost. Currently, a prior art technique is to use synchronization software that allows a user to periodically back up data from their mobile telephone to a computer. This approach, however, is awkward in that a consumer must take the time and effort to physically connect a mobile telephone to his or her computer and perform the backup process. If a consumer is hit by a computer virus before they have a chance to back up important data, the data will be lost. This approach also requires that a computer be available and is certainly not the most convenient approach for the consumer. Even if data has been backed up, it is time-consuming and awkward to restore the data.

Accordingly, a technique is desired that would allow users of mobile telephones and other wireless handheld devices to simply and easily backup important information and to restore that information.

SUMMARY OF THE INVENTION

To achieve the foregoing, and in accordance with the purpose of the present invention, a technique is disclosed that backs up and restores modified user data in a wireless device.

In a first embodiment a method backs up user data in a mobile telephone. First, a software hook mechanism is implemented to detect changes in user data of the mobile telephone. Once a change is detected in the user data, resulting in modified user data, the modified user data is stored in an internal memory drive of the mobile telephone. Next, a copy of the modified user data is stored onto an external memory card of the mobile telephone. In this fashion, the copy of the modified user data is not erased when the mobile telephone is reset.

In a second embodiment a method restores user data in a mobile telephone. A first step includes receiving an indication from the user or the device to restore user data. Next, the method includes selecting a type of user data to be restored. The selected type of user data is read from an external memory card of the mobile telephone. Finally, the selected type of user data is written to an internal memory drive of the mobile telephone.

In a third embodiment a mobile telephone includes an application processor, internal memory, and an external memory card. User data is stored in the internal memory; the internal memory is arranged such that the user data is erased when the mobile telephone is reset. A backup software module is arranged to detect a change in the user data, resulting in modified user data. The backup software module stores a copy of the modified user data onto said external memory card. A restore software module is arranged to read the modified user data from the external memory card and to write the modified user data onto the internal memory.

BRIEF DESCRIPTION OF THE DRAWINGS

The invention, together with further advantages thereof, may best be understood by reference to the following description taken in conjunction with the accompanying drawings in which.

DETAILED DESCRIPTION OF THE INVENTION

The present invention is applicable to any of a wide variety of types of mobile telephones and includes smart telephones as well as other wireless devices that include a mobile telephone such as certain personal digital assistants and other wireless handheld devices that send and receive information over a communications network. Examples include PDAs that incorporate a mobile telephone, a smart phone operating on the Symbian platform or the WinCE platform, a Blackberry wireless device, and others having telephone capabilities.

Although the below disclosure describes open telephone operating systems such as the Symbian and WinCE platforms, the present invention is applicable to other types of mobile telephones having an external storage card or memory card.

As described above, a wide variety of user data is stored on a mobile telephone by a consumer and is at risk of being lost unless that data is backed up appropriately and a suitable restore technique is available. This user data includes personal information such as: information in an address book (names, addresses, telephone numbers, etc.); calendar information and notes; messages received via SMS, MMS, or other similar message protocol; e-mail messages, and caller identification information.

In a preferred embodiment of invention, user data such as photographs, video clips, images, and voice recordings is not targeted for backup as this data would require large amounts of storage on the external storage card. Of course, in other embodiments where large amounts of storage are available, this type of user data may be the subject of a backup.

The present invention addresses backing up this user data in real time on storage on the mobile telephone itself such that the data can be restored simply and easily in the event of a virus infection, the need to reset, etc. In particular, the data is backed up in specific situations such as when the user adds new information, the user modifies the data, or when the user receives an SMS message, e-mail message or other data. If the telephone needs to be reset, the present invention operates to restore the data from the storage on the mobile telephone.

Figure 1:
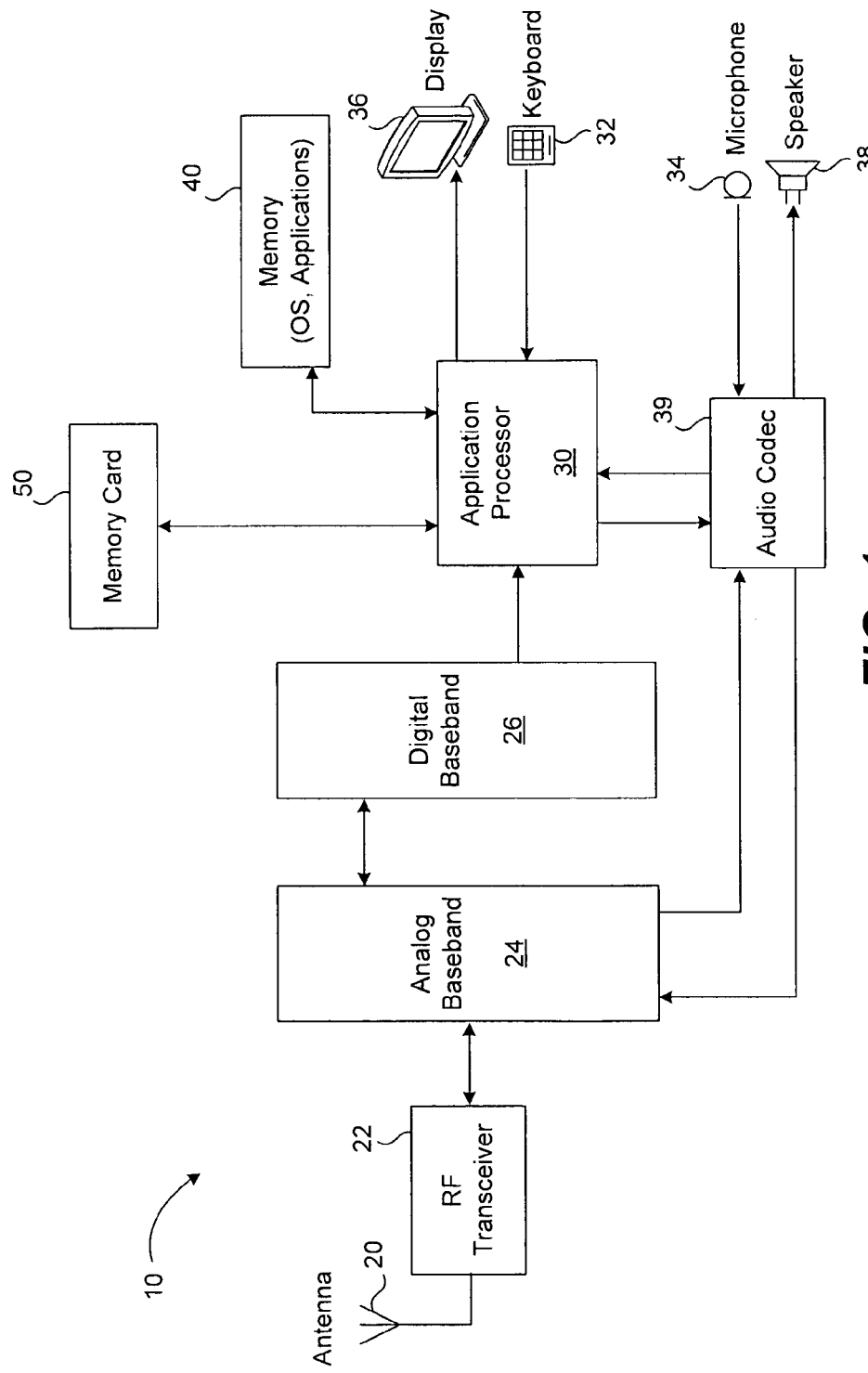
FIG. 1 is a block diagram of a mobile telephone according to one embodiment of the invention.

FIG. 1 is a block diagram of a mobile telephone 10 according to one embodiment of the invention. In this embodiment, telephone 10 is a so-called "smart phone," i.e., a wireless device arranged to run a standard operating system as well as supporting software applications from other vendors. Telephone 10 may also be embedded in another type of handheld wireless device as described above. Often such a telephone has a dedicated application processor in addition to the processor used for communications functions.

Telephone 10 includes an antenna 20, an RF transceiver 22 and both analog and digital baseband modules 24 and 26 for communication in two modes. An application processor 30 runs the operating system and any applications running on the telephone. A keypad 32 and a microphone 34 provide input to the device, while a display 36 and a speaker 38 provide output. Memory 40 is typically flash memory that stores the operating system for the device and any additional software applications. Memory card 50 is any suitable storage medium used to store data such as text, pictures, audio, video, etc. Card 50 may also be termed a flash memory card or a storage card, and although many current products use flash memory other technologies are being developed and are encompassed by this description. There are a wide variety of types of memory cards on the markets including the SD card (secure digital card), the CF card (compact flash card), the Smart Media card, the memory stick and the multimedia card (MMC). These cards are of varying sizes, shapes and interfaces, and have a range of storage capacities. Each type of card will use a particular interface protocol to communicate with and physically connect to telephone 10, and such interfaces are known to those of skill in the art. Earlier storage media such as the PC card and a smart card may also be considered memory cards. Memory cards are especially suited for portable devices such as mobile telephones, PDAs and other wireless devices as they are removable.

In a particular embodiment of the invention the operating system running on telephone 10 is the Microsoft Windows CE operating system, the Symbian operating system or the Palm operating system, Palm OS. As is known in the art, Windows CE is a stripped-down version of Microsoft's operating system designed for use on portable devices such as PDAs and mobile telephones. The Symbian operating system is also designed for use on similar portable devices.

Implementation of memory 40 and memory card 50 is handled differently by the different operating systems. Memory 40 is also referred to as the "C:" drive or native or internal drive, and memory card 50 is also referred to as the "E:" drive or external drive in an operating system where the C: drive and the E: drive are separate drives. In another operating system where only the C: drive is used, the memory card or E: drive exists as a subdirectory of the root drive. As explained above, a computer virus, bug or other event causing the mobile telephone to be reset typically causes data on the internal drive, or C: drive to be lost. Data stored on the external drive, i.e., memory card 50, would not be lost in such a situation. The present invention thus realizes a technique to backup important data from the internal drive to the external drive and then to restore such data when needed.

User Data Backup

Figure 2:
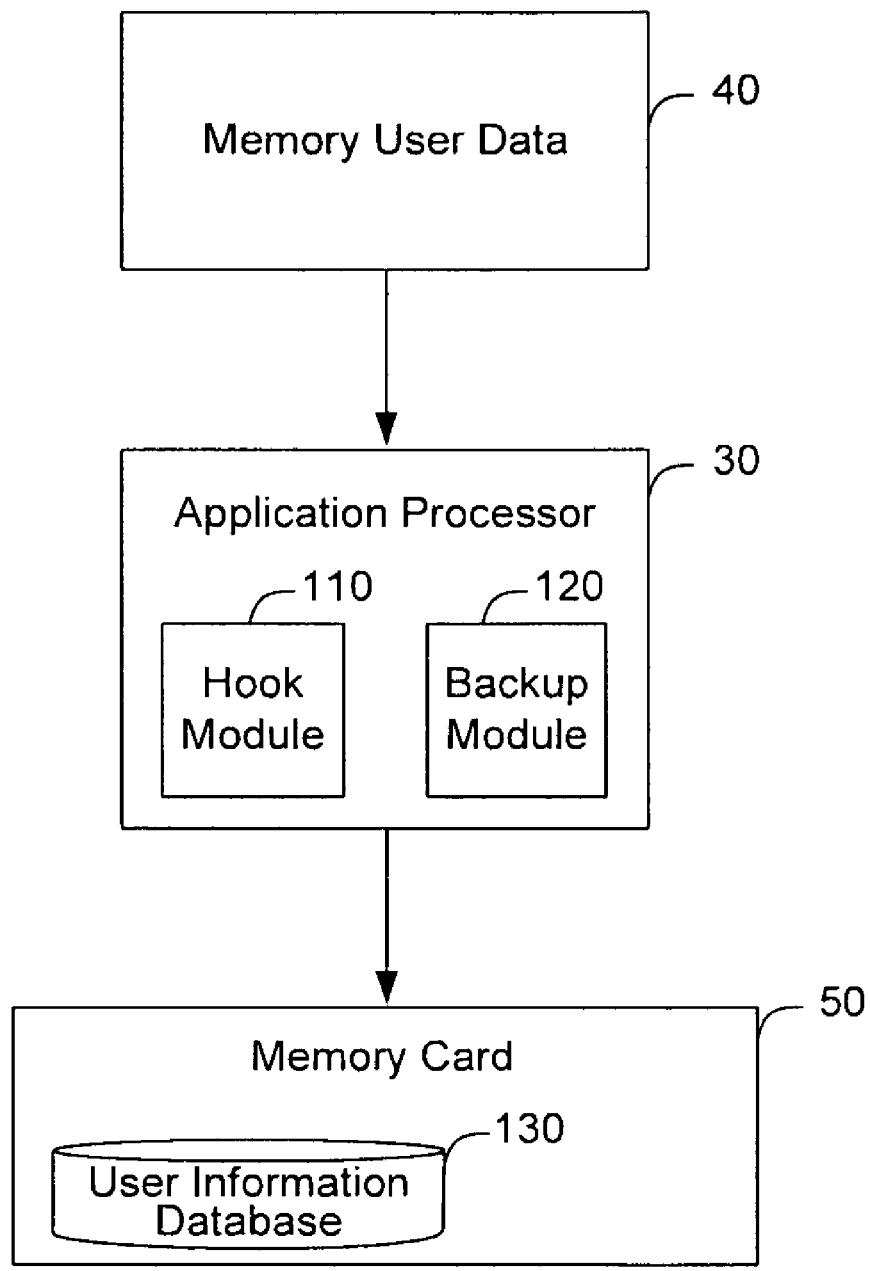
FIG. 2 is a block diagram illustrating one arrangement by which user data is backed up to memory card using a hook module and a backup module.

FIG. 2 is a block diagram illustrating one arrangement by which user data is backed up to memory card 50 using a hook module 110 and a backup module 120. Hook module 110 is a software module that monitors any changes to the user data; if any changes are detected, the hook module notifies the backup module. The backup module then backs up the relevant user data by storing a copy of it onto memory card 50 in database 130. The backup process is transparent to the normal telephone operation as the hook module and the backup module run in the background. Hook module 110 and backup module 120 are normally resident in memory 40.

For both the Symbian and WinCE platforms the C++ language is used to implement the hook module and the backup module. The two modules are able to be deployed to either internal storage (preferred) or to external storage. Both of these modules use an auto-start mechanism on both platforms. The MDL plug-in is used on the Symbian platform which can be loaded during telephone booting. On the WinCE platform an autorun program in is registered in the Registry.

As will be appreciated by one of skill in the art, the hook technology used and the actual hook module will differ for each computing platform. The below description of the flow diagram provides an example under the Symbian platform.

Figure 3:
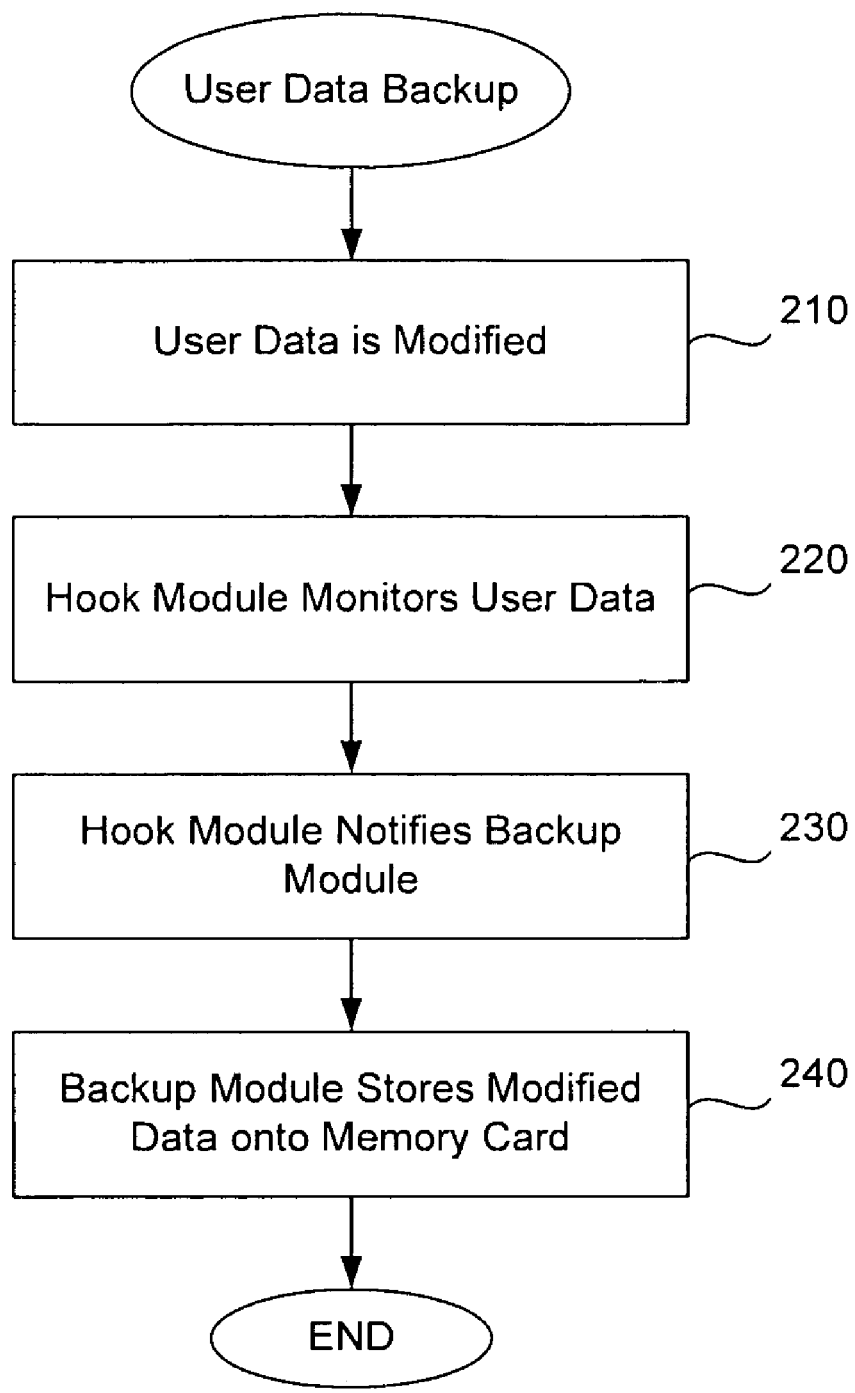
FIG. 3 is a flow diagram describing how the user data is backed up.

FIG. 3 is a flow diagram describing how the user data is backed up. It is realized that an operating system for a mobile telephone (especially a smart phone) utilizes application programming interfaces (APIs) to perform file input/output. Further, it is realized that a software hook may be placed into the API in order to detect when user data is added, changed or otherwise introduced. For example, APIs that implement "file open," "file write" and "file close" operations may be hooked by the present invention.

In one example, consider a mobile telephone that is receiving a file over a Bluetooth channel. Bluetooth first creates a file, receives the file contents, and then closes the file. A hook implemented using the present invention detects the "close file" operation, scans the file for updated data and then backs up this data to the external drive.

At 210 the user data on the native or internal drive is modified, deleted, or added to in some fashion. As mentioned above, the address book or phone book is modified or added to, an SMS or e-mail message is received, etc. At 220 hook module 110 monitors and records the change in data. The actual hook mechanism will depend on the specific OS platform and the underlying subsystem. Some subsystems provide a plug-in mechanism or an event driven interface that allows a developer to easily control it. For instance, in the "PhoneBook Engine" under the Symbian OS platform there are a set of objects that implement a call back/event-driven mechanism when the address book or phone book of the mobile telephone changes.

These objects are as follows:
1. class CPbkContactEngine. This is the engine that controls the data of phone book database.
2. class CpbkContactChangeNotifier. This notifier object combines the engine and user's code (the implementation of MPbkContactDbObserver).
3. class MpbkContactDbObserver. This is the interface for the developer. The two major functions in the class are called when the phone book database is modified by the telephone user or by the operating system. We are able to implement the interface by supplying saving and backup functional code.

Here is sample code to implement the hook mechanism in this operating system for address book changes.

```
class MyPbkHook : public CBase, public MPbkContactDbObserver
{
public:
    //Create an instance of MyPbkHook
    static MyPbkHook* NewL(CPbkContactEngine* aEngine)
    {
        ...
    }
protected:
    //Call back function of class MPbkContactDbObserver
    void HandleDatabaseEventL(TContactDbObserverEvent aEvent)
    {
        //Here we add code for saving the changes. A short example:
        switch (aEvent.iType)
        {
        case EContactDbObserverEventContactChanged:
        case EContactDbObserverEventContactAdded:
        case EContactDbObserverEventUnknownChanges:
        case EContactDbObserverEventCurrentItemChanged:
        case EContactDbObserverEventGroupAdded:
        case EContactDbObserverEventCurrentItemChanged:
           {
             SaveContactChangesL(aEvent.iContactId,
             aEvent.iConnectionId)
             break;
           }
        case EContactDbObserverEventContactDeleted:
        case EContactDbObserverEventCurrentItemDeleted:
           {
             RemoveContactL(aEvent.iContactId, aEvent.iConnectionId);
             break;
           }
        defaule:
             break;
```

```
    }
  }
private:
    CPbkContactEngine* iEngine;
}
//Initialize the objects
iPbkEngine = CPbkContactEngine::NewL( );
iPbkHook = MyPbkHook::NewL(iPbkEngine);
iPbkNotifier = CPbkContactChangeNotifier::NewL(*iPbkEngine,
iPbkHook);
//Now the hook mechanism is set up
```

Setting up a hook mechanism to detect and store received SMS text messages is similar. By implementing the below example code we can detect all SMS text messages when they arrive.

```
//iSocket is a RSocket instance.
       //First open the socket to monitor SMS datagram
       iSocket.Open(iSocketServer,
          KSMSAddrFamily, KSockDatagram, KSMSDatagramProtocol)
    //Call asynchronous method to wait for data incoming.
       iSocket.Ioctl(KIOctlSelect, iStatus, &iBuf,KSOLSocket);
    ...
       //Wait for data being able to be read
       iSocket.Ioctl(KSockSelectRead, iStatus, &iBuf,KSOLSocket);
       //Now we can get the SMS messages
       RSmsSocketReadStream readstream(iSocket);
       readstream >> *SmsMsg;
       //Backup the SMS. A short example:
       SmsBackupStream << *SmsMsg;
       SmsBackupStream.CommitL( );
```

For other subsystems (i.e., other types of data) that do not provide such mechanisms, we can utilize the system APIs to obtain the data to be backed up. For instance, a file system hook under the Symbian operating system may be used. First we implement an LDD (Logical Device Driver) running in kernel privilege mode and load it into the kernel side. Next, we supply an address table of the hooked system APIs to the LDD and initialize the hooking mechanism. The LDD is able to modify the various entry point instructions of these functions and make the process flow switch to our code. Our code is then able to backup the necessary data. Using this technique we can obtain any type of data added to or modified within a mobile telephone.

At 230 the hook module notifies the backup module of the relevant data to back up. In the example presented above the code for the backup module is also present in the same module as the hook module code so no explicit notification step is necessary. In other embodiments where the backup module is separate from the hook module then a straightforward function call or other interprocess communication technique may be used to notify the backup module. For example, an interprocess communication API may be used such as "Memory Share" under the Microsoft operating system. Generally, these two modules are separate. The hook module uses stub functions, so these stub functions can then call real functions in the backup module via IPC (Inter-Process Communication). Or, a client/server architecture technique may be used under the Symbian operating system. For example, the hook module takes on the role of client and the backup module takes on the role of server.

At 240 the backup module (or combined hook module and backup module code) stores the modified data onto memory card 50 into user information database 130. Database 130 may be a file or set of files, a database software product or other memory construct used to store information. In this step under certain operating systems the information is written to memory card 50 that is a separate drive E. In other operating systems the information is written to the memory card by accessing a subdirectory of the root directory. Data may be backed up using different techniques and in different formats, depending upon the application, the type of operating system, the type of memory card used, etc. For example, the data may be backed up using a proprietary format of the application developer or the data may also be encrypted when stored.

In one particular embodiment, three separate files are used for efficiency to back up the address book data, the SMS text message data and the calendar data. Of course, should other types of data be present (such as e-mail messages, photographs, etc.) than other files would be used. For the address book data, the backup information for each entry includes: name, mobile telephone number, telephone number, e-mail address, company name, job title, fax number, birthday, home address, etc. For the SMS text message data, the backup information for each entry includes: message title, message time, message body, message attached file and the message flag. For the calendar data, the backup information for each data includes: event time, event description, event location and the event flag.

Figure 6A:
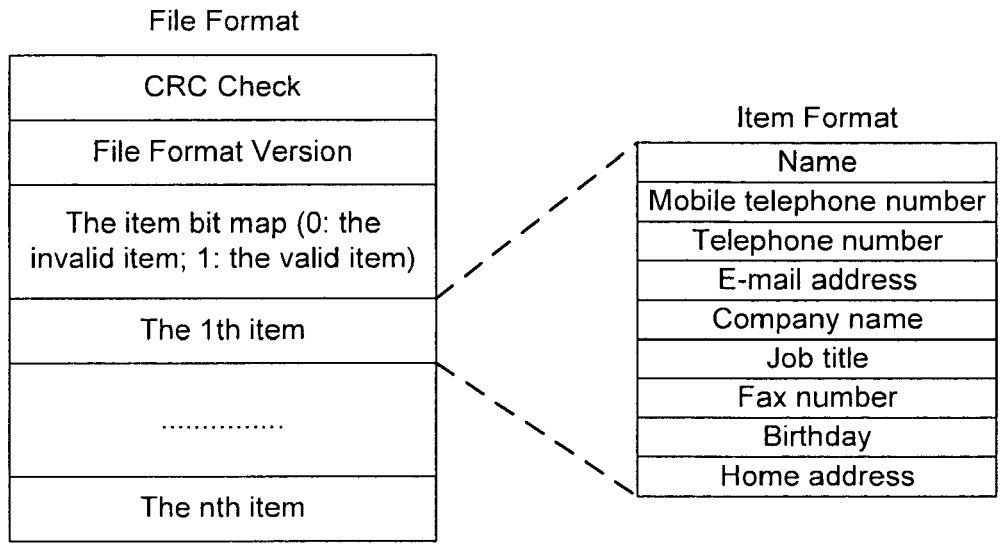
FIG. 6A illustrates the backup file format for an address book of a telephone.

For an address book of a telephone, the backup file format may be as shown in FIG. 6A. As shown, the backup file includes items such as name, telephone numbers, E-mail address, company, title, address, etc.

Figure 6B:
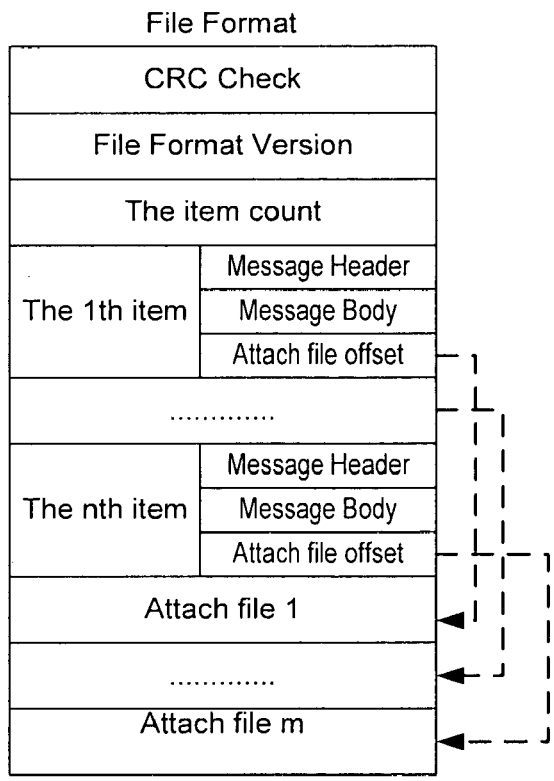
FIG. 6B illustrates the backup file format for messages.

For messages of a telephone, the backup file format may be as shown in FIG. 6B. As shown, the backup file includes any number of items (messages), each message including a header, body and a file offset. The file offset indicates the location of the attached file in the backup file.

Figure 6C:
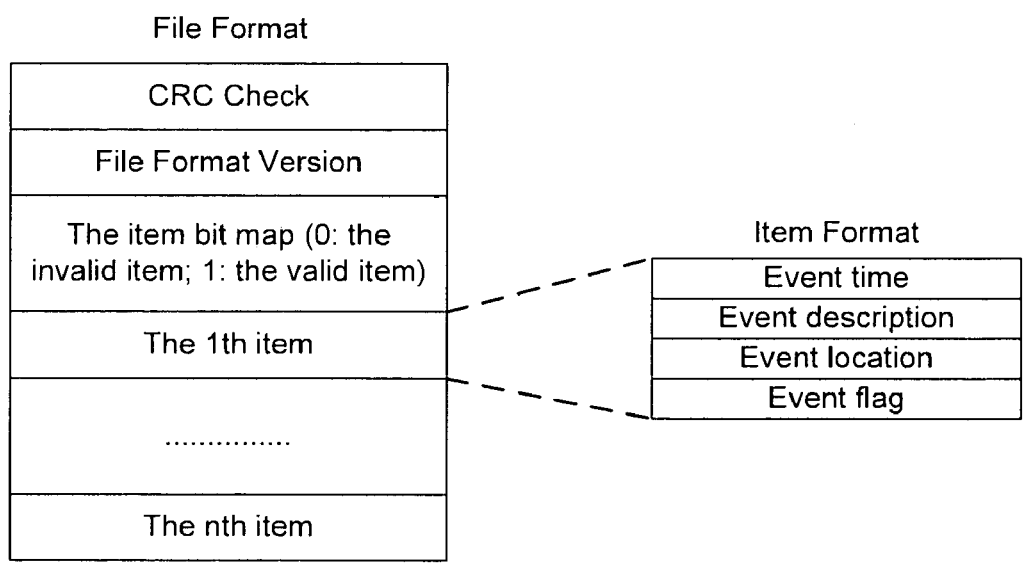
FIG. 6C illustrates the backup file format for calendar data.

For calendar data of a telephone, the backup file format may be as shown in FIG. 6C. As shown, the backup file includes any number of items, each item including an event time, an event description, an event location and an event flag.

User Data Restore

Figure 4:
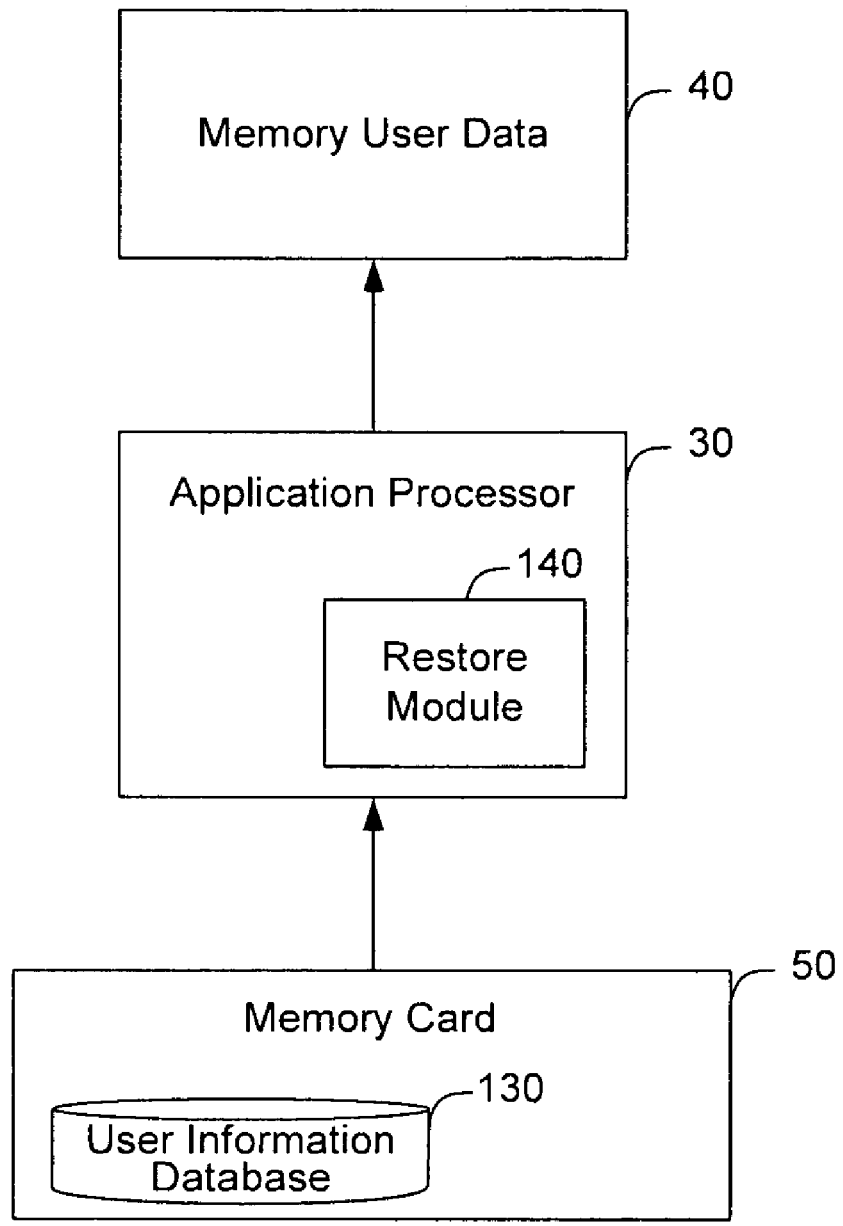
FIG. 4 is a block diagram illustrating one arrangement by which user data is restored using restore module.

FIG. 4 is a block diagram illustrating one arrangement by which user data is restored using restore module 140. The restore module is a software module that will restore the contents of user information database 130 back into memory 40 once the mobile telephone has been reset or when the restore operation is activated. In a preferred embodiment of the invention, restore module 140 is resident on the external drive or memory card 50 so that it is not lost or erased when a reset occurs.

Figure 5:
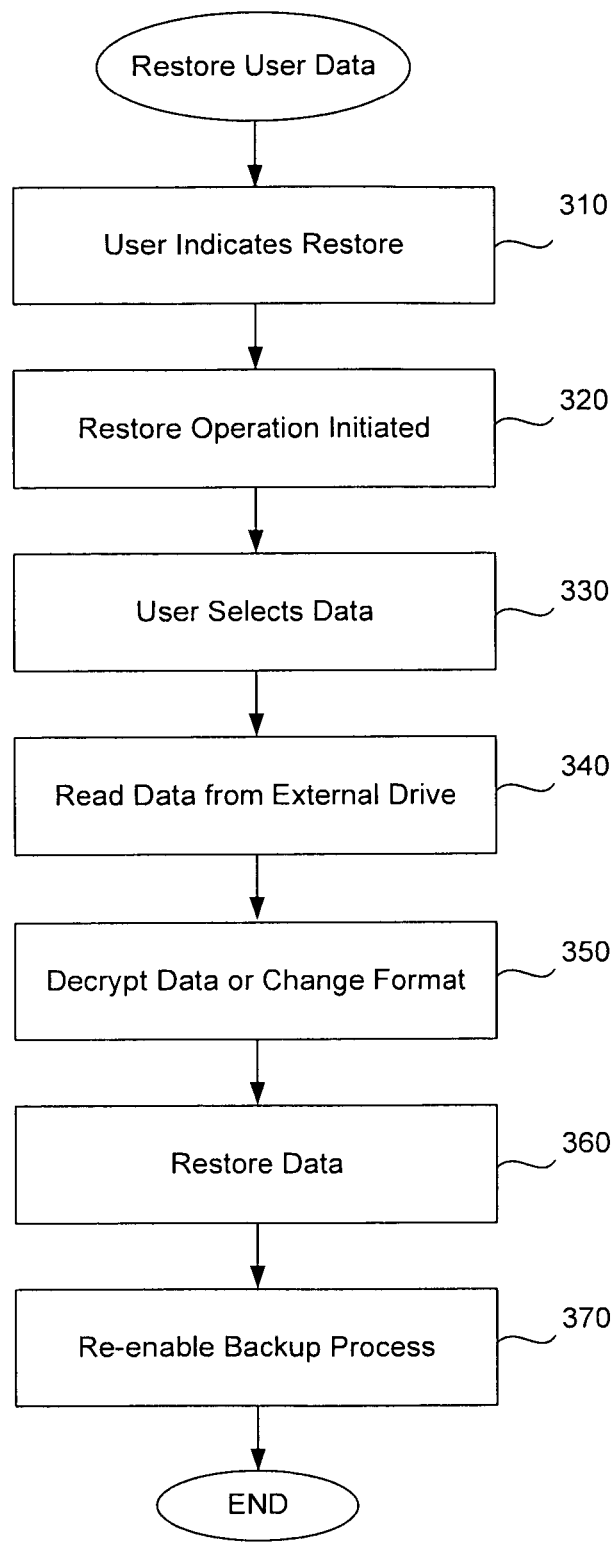
FIG. 5 is a flow diagram describing how user data is restored.

FIG. 5 is a flow diagram describing how user data is restored. At 310 the mobile telephone user indicates that a restore operation is desired. In this situation the user has experienced a computer virus or other malware causing personal user data on the internal drive to be lost, or a virus or other event has made it necessary to perform a reset that has erased the personal data. The user may initiate a restore operation using any suitable technique. For example, the user gives a voice command, presses a key, sequence of keys or multiple keys in order to begin the restore operation; or, a "restore" icon may appear in the telephone menu. In certain embodiments a restore operation may begin automatically such as when a telephone reset is performed.

At 320 the restore operation is initiated. The restore module code is loaded from the external drive into application processor 30 and its code is executed. At 330 the user optionally selects the data to be restored. In some embodiments all backup data will be restored automatically. The user is given the option to select and restore any or all of the following data: address book data; SMS text message data; e-mail data; etc. The user may select these options by pressing keys, by giving voice commands or by selecting an icon on the screen menu.

At 340 the selected data is read from the external drive, i.e., memory card 50. The data is read from the backup file. Preferably, the data is read from the external drive one type at a time, e.g., address book information, SMS text message data and then calendar data. At 350 the data is decrypted if it had been encrypted and it is also changed back into the appropriate format of the operating system if it had been stored in a proprietary format.

At 360 the data is restored by calling the relevant API to restore the data from the external drive back into its appropriate location on the internal drive. For example, for address book information we use the following function to restore this contact information:

```
CPbkContactEngine:: AddNewContactL(CPbkContactItem& aContact,
TBool aImmediateNotify=EFalse)
  In order to restore SMS text messages we make use of the following
  classes:
    //Create the session to SMS Sending Server
    iSession = CMsvSession::OpenAsyncL(*this);
    ...
    //Create the SMS message object
      iClientMtmReg = CClientMtmRegistry::NewL(*iSession);
      iSmsMtm = static_cast<CSmsClientMtm*>(iClientMtmReg-
      >NewMtmL(KUidMsgTypeSMS));
    //Intilize SMS object
    ...
    // Create entry to drafts
      iSmsMtm->SwitchCurrentEntryL(KMsvGlobalInBoxIndexEntryId);
    // Creates a new child entry owned by the context synchronously.
      iSmsMtm->Entry( ).CreateL(indexEntry);
    // Set the MTM's active context to the new message
      iSmsId = indexEntry.Id( );
      iSmsMtm->SwitchCurrentEntryL(iSmsId);
    // Add message body. Body is set twice because index entry keeps
    // a copy of some summary information. Index entry and full stored
    // entry should be synchronized.
    ...
    // Commit changes because index entry is only a local variable
      iSmsMtm->Entry( ).ChangeL(indexEntry);
    // Save full message data to the store
      iSmsMtm->SaveMessageL( );
```

At 370 the backup mechanism is re-enabled after the restore is finished. During restoring, the hook mechanism is temporarily disabled, under the assumption that the data will remain consistent. Other types of user data such as e-mail messages, etc., may also be restored using variations on the above techniques.

Further Embodiments

In one specific embodiment of the invention, the invention is integrated with the product Trend Micro Mobile Security (TMMS) version 2.0 available from Trend Micro, Inc. of Cupertino, Calif. TMSS helps protect data-centric mobile devices (such as smart phones and wireless handheld devices) from computer viruses and SMS spam. The product TMMS is compatible with the Microsoft mobile operating systems and with the Symbian versions 7 and 8 operating systems.

The present invention may also be used in the context of all malicious software, or malware, that generally causes harm to a computer system, provides an effect that is not expected by the user, is undesirable, illegal, or otherwise causes the user to want to restore their computer system from a time prior to when it was infected by the malware. Malware can be classified based upon how is executed, how it spreads or what it does. The below descriptions are provided as guidelines for the types of malware currently existing; these classifications are not exact in that many groups overlap. For example, commercially available so-called "anti-virus" software is designed to scan a computer for viruses and worms, as well as for other malicious software. Of course, later developed software not currently known may also fall within the definition of malware. As used herein, the term malware is used to describe both the examples of malware and grayware described below.

When computer viruses first originated common targets were executable files and the boot sectors of floppy disks; later targets were documents that contain macro scripts, and more recently, many computer viruses have embedded themselves in e-mail as attachments. With executable files the virus arranges that when the host code is executed the virus code is executed as well. Normally, the host program continues to function after it is infected by the virus. Some viruses overwrite other programs with copies of themselves, thus destroying the program. Viruses often spread across computers when the software or document to which they are attached is transferred from one computer to another.

Computer worms are similar to viruses but are stand-alone software and thus do not require host files or other types of host code to spread themselves; they can move over the Internet using e-mail or socket connections. They do modify the host operating system, however, at least to the extent that they are started as part of the boot process. In order to execute, worms either exploit some vulnerability of the target host or use some kind of social engineering to trick users into executing them. Once executed, a computer worm might drop a backdoor program or a computer virus. Computer viruses and worms have common characteristics and that they both can propagate, they are covert and their effects can be devastating. Other differences are that a virus will attack the affected program while it is running, while a worm can attack other programs; viruses typically attack local files while worms typically attack remote network computers.

A Trojan horse program is a harmful piece of software that is often disguised as legitimate software. Trojan horses cannot replicate themselves, unlike viruses or worms. A Trojan horse can be deliberately attached to otherwise useful software by a programmer, or can be spread by tricking users into believing that it is useful. Some Trojan horses can spread or activate other malware, such as viruses (a dropper). A wabbit is a third, uncommon type of self-replicating malware. Unlike viruses, wabbits do not infect host programs or documents. And unlike worms, rabbits do not use network functionality to spread to other computers. A simple example of a wabbit is a fork bomb.

A backdoor is a piece of software that allows access to the computer system by bypassing the normal authentication procedures. There are two groups of backdoors depending upon how they work and spread. The first group work much like a Trojan horse, i.e., they are manually inserted into another piece of software, executed via their host software and spread by the host software being installed. The second group work more like a worm in that they get executed as part of the boot process and are usually spread by worms carrying them as their payload. The term ratware has arisen to describe backdoor malware that turns computers into zombies for sending spam.

An exploit is a piece of software that attacks a particular security vulnerability. Exploits are not necessarily malicious in intent—they are often devised by security researchers as a way of demonstrating that vulnerability exists. They are, however, a common component of malicious programs such as network worms. A root kit is software inserted onto a computer system after an attacker has gained control of the system. Root kits often include functions to hide the traces of the attack, as by deleting logged entries or by cloaking the attacker's processes. Root kits might include backdoors, allowing the attacker to easily regain access later or to exploit software to attack other systems. Because they often hook into the operating system at the kernel level to hide their presence, root kits can be very hard to detect.

Key logger software is software that copies a computer user's keystrokes to a file which it may send to a hacker at a later time. Often the key logger software will only awaken when a computer user connects to a secure web site such as a bank. It then logs the keystrokes, which may include account numbers, PINs and passwords, before they are encrypted by the secure web site. Software known as URL injection software modifies a browser's behavior with respect to some or all domains. It modifies the URL submitted to the server to profit from a given scheme by the content provider of the given domain. This activity is often transparent to the user.

A robot network or botnet is a large number of compromised computers that are used to create denial of service attacks or to send spam autonomously (also termed a zombie army). A target computer is often compromised via a Trojan horse that opens an IRC channel and waits for remote commands from the person in control of the botnet. The software of the botnet (botware) may be run as an independent process, but it tends to run inside other normal processes.

Other techniques used by malware include the following. A remote buffer overflow attack takes advantage of a security flaw in a computer and can be used by a worm, botnet, or by a hacker's remote control. Remote thread injection is a software development technique used to inject code into another process to run it as a thread. A hacker can use this same technology to propagate others processes without any file operations in order to disguise malware.

Another category of undesirable software is grayware. Grayware includes applications that cause annoying and possibly undesirable or unforeseen behavior in the way the programs run. Grayware is not necessarily detrimental to basic system operations, but it harbors the risk of opening computer vulnerabilities. Some applications classified as grayware are misused for malicious activity while others together and transmit information about a computer user's behavior. Grayware includes spyware, adware, dialers, hacking tools, joke programs and remote access tools.

Spyware is a piece of software that collects and sends information (such as browsing patterns or credit card numbers) about users and the results of their computer activity without explicit notification. Spyware usually works and spreads like Trojan horses. Adware is software that displays banner advertisements or pop-up advertisements when a computer is in use. Adware can have undesired effects on the system, such as interrupting an Internet connection or system operations, and is generally regarded as irritating and intrusive by users. A dialer is a program that replaces the telephone number in a modem's dial-up connection with a long-distance number (often out of the country) in order to run up telephone charges on pay-per-dial numbers, or dials out at night to send key logger or other information to a hacker.

Hacking tools render a computer or network more vulnerable to attack or use simulated hacking to test the vulnerability of accessible components. Hacking tools can be used to spy on an entire network and make it easy to exploit vulnerabilities. Although used to test the security of networks, they can be misused. Joke programs are relatively harmless although they can be annoying, such as by simulating a virus attack. Remote access tools enable remote access to an infected computer, thus permitting outside administration or manipulation. These tools are legitimate tools for managing external computers although they can be used to exploit vulnerabilities and can be misused.

Computer System Embodiment

Figure 7A:
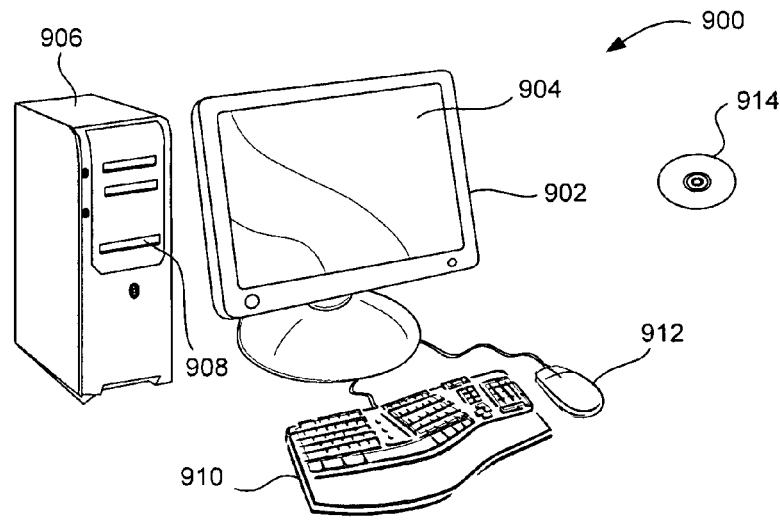
FIGS. 7A and 7B illustrate a computer system suitable for implementing embodiments of the present invention.
Figure 7B:
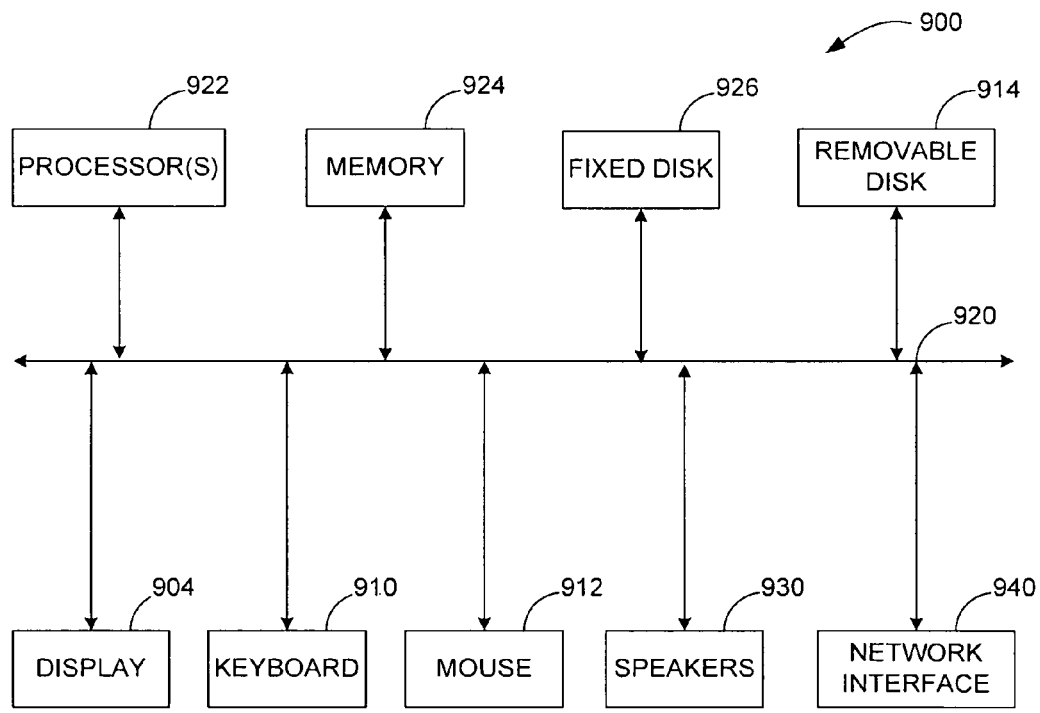

FIGS. 7A and 7B illustrate a computer system 900 suitable for implementing embodiments of the present invention. FIG. 7A shows one possible physical form of the computer system. Of course, the computer system may have many physical forms including an integrated circuit, a printed circuit board, a small handheld device (such as a mobile telephone or PDA), a personal computer or a super computer. Computer system 900 includes a monitor 902, a display 904, a housing 906, a disk drive 908, a keyboard 910 and a mouse 912. Disk 914 is a computer-readable medium used to transfer data to and from computer system 900.

FIG. 7B is an example of a block diagram for computer system 900. Attached to system bus 920 are a wide variety of subsystems. Processor(s) 922 (also referred to as central processing units, or CPUs) are coupled to storage devices including memory 924. Memory 924 includes random access memory (RAM) and read-only memory (ROM). As is well known in the art, ROM acts to transfer data and instructions uni-directionally to the CPU and RAM is used typically to transfer data and instructions in a bi-directional manner. Both of these types of memories may include any suitable of the computer-readable media described below. A fixed disk 926 is also coupled bi-directionally to CPU 922; it provides additional data storage capacity and may also include any of the computer-readable media described below. Fixed disk 926 may be used to store programs, data and the like and is typically a secondary storage medium (such as a hard disk) that is slower than primary storage. It will be appreciated that the information retained within fixed disk 926, may, in appropriate cases, be incorporated in standard fashion as virtual memory in memory 924. Removable disk 914 may take the form of any of the computer-readable media described below.

CPU 922 is also coupled to a variety of input/output devices such as display 904, keyboard 910, mouse 912 and speakers 930. In general, an input/output device may be any of: video displays, track balls, mice, keyboards, microphones, touch-sensitive displays, transducer card readers, magnetic or paper tape readers, tablets, styluses, voice or handwriting recognizers, biometrics readers, or other computers. CPU 922 optionally may be coupled to another computer or telecommunications network using network interface 940. With such a network interface, it is contemplated that the CPU might receive information from the network, or might output information to the network in the course of performing the above-described method steps. Furthermore, method embodiments of the present invention may execute solely upon CPU 922 or may execute over a network such as the Internet in conjunction with a remote CPU that shares a portion of the processing.

In addition, embodiments of the present invention further relate to computer storage products with a computer-readable medium that have computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs and holographic devices; magneto-optical media such as floptical disks; and hardware devices that are specially configured to store and execute program code, such as application-specific integrated circuits (ASICs), programmable logic devices (PLDs) and ROM and RAM devices. Examples of computer code include machine code, such as produced by a compiler, and files containing higher level code that are executed by a computer using an interpreter.

Although the foregoing invention has been described in some detail for purposes of clarity of understanding, it will be apparent that certain changes and modifications may be practiced within the scope of the appended claims. Therefore, the described embodiments should be taken as illustrative and not restrictive, and the invention should not be limited to the details given herein but should be defined by the following claims and their full scope of equivalents.

We claim:

1. A method of backing up user data in a mobile telephone, said method comprising:

implementing a software hook mechanism to detect changes in user data of said mobile telephone wherein user data is stored on said mobile telephone by a user;

detecting a change in said user data resulting in modified user data;

storing said modified user data in an internal memory drive of said mobile telephone;

storing a copy of said modified user data onto an external memory card of said mobile telephone by a backup software module immediately upon detecting said change in user data by said software hook mechanism, whereby said copy of said modified user data is not erased when said mobile telephone is reset;

disabling said backup software module upon reading said copy of said modified user data from said external memory card; and re-enabling said backup software module when writing said copy of said modified user data onto said internal memory drive is complete.

2. A method as recited in claim 1 wherein said mobile telephone is a smart telephone, a personal digital assistant, a Blackberry or an electronic personal organizer.

3. A method as recited in claim 1 wherein said user data is an entry in an electronic address book of said mobile telephone, is an SMS text message, is an e-mail message or is a calendar entry.

4. A method as recited in claim 1 wherein said change in said user data is an addition of user data, a deletion of user data, or a modification of user data.

5. A method as recited in claim 1 wherein said internal memory drive is a flash memory of said mobile telephone.

6. A method as recited in claim 1 wherein said external memory card of said mobile telephone is an SD (secure digital) card, a CF (compact flash) card, a Smart Media card, a memory stick or a multimedia card (MMC).

7. A method as recited in claim 1 wherein said software hook mechanism operates from within an application programming interface (API) of said mobile telephone.

8. A method as recited in claim 1 wherein said software hook mechanism operates while said mobile telephone is in use and is transparent to normal operation of said mobile telephone.

9. A mobile telephone comprising:
an application processor;
internal memory;
an external memory card;
user data stored in said internal memory wherein said user is stored on said mobile telephone by a user; said internal memory being arranged such that said user data is erased when said mobile telephone is reset;
a backup software module arranged to detect a change in said user data resulting in modified user data and to store a copy of said modified user data onto said external memory card immediately upon detecting said change in user data;
a restore software module arranged to read said modified user data from said external memory card and to write said modified user data onto said internal memory, said restore softward module being arranged to disable said backup software module when reading said modified user data from said external memory card and to re-enable said backup software module when writing said modified user data onto said internal memory.

10. A mobile telephone as recited in claim 9 wherein said mobile telephone is a smart telephone, a personal digital assistant, a Blackberry or an electronic personal organizer.

11. A mobile telephone as recited in claim 9 wherein said user data is an entry in an electronic address book, is an SMS text message, is an e-mail message or is a calendar entry.

12. A mobile telephone as recited in claim 9 wherein said change in said user data is an addition of user data, a deletion of user data, or a modification of user data.

13. A mobile telephone as recited in claim 9 wherein said internal memory drive is a flash memory of said mobile telephone.

14. A mobile telephone as recited in claim 9 wherein said external memory card of said mobile telephone is an SD (secure digital) card, a CF (compact flash) card, a Smart Media card, a memory stick or a multimedia card (MMC).

15. A mobile telephone as recited in claim 9 wherein said backup software module operates from within an application programming interface (API) of said mobile telephone.

* * * * *

UNITED STATES PATENT AND TRADEMARK OFFICE
CERTIFICATE OF CORRECTION

PATENT NO.           : 7,729,690 B1                                             Page 1 of 1
APPLICATION NO.      : 11/355846
DATED                : June 1, 2010
INVENTOR(S)          : Huang et al.

It is certified that error appears in the above-identified patent and that said Letters Patent is hereby corrected as shown below:

Column 13, line 17   Change "softward" to --software--

Signed and Sealed this
Twelfth Day of June, 2012

David J. Kappos
*Director of the United States Patent and Trademark Office*